Oct. 9, 1945. C. GROTKE 2,386,680
DISPLACING GEAR FOR BOMBS
Filed July 29, 1942 3 Sheets-Sheet 2
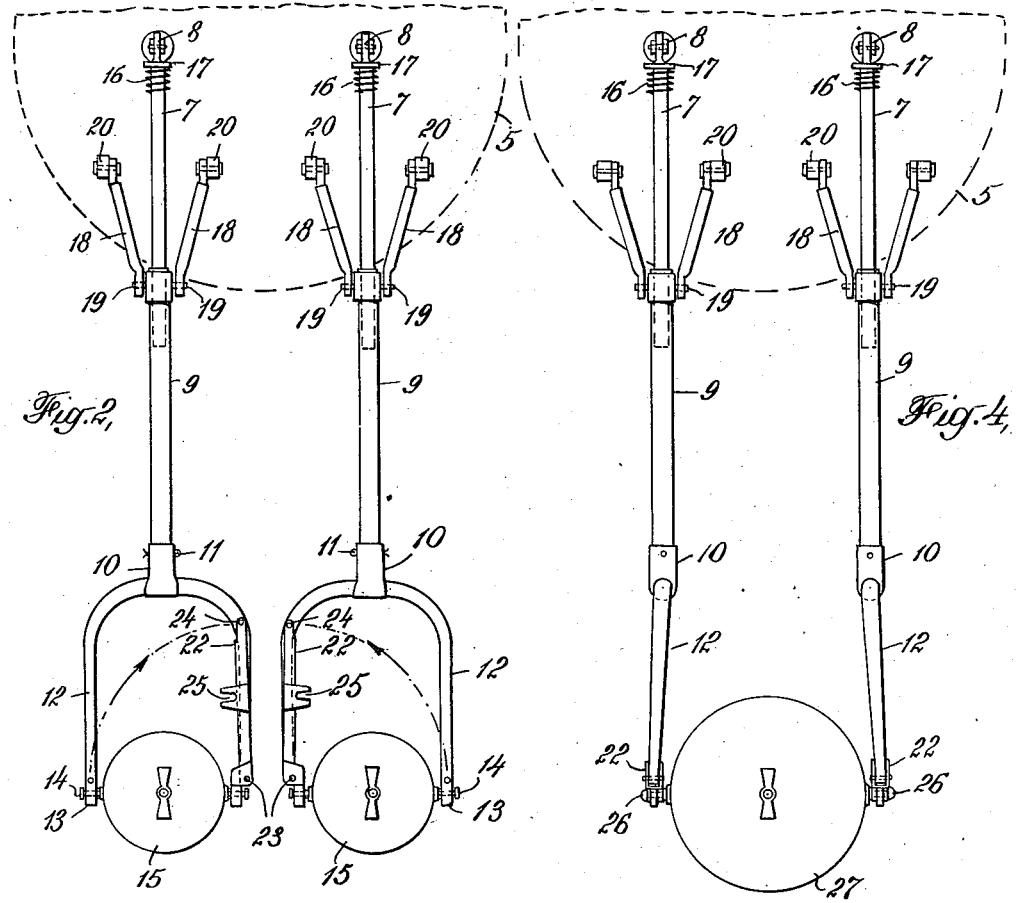
INVENTOR
Charles Grotke
BY
ATTORNEYS

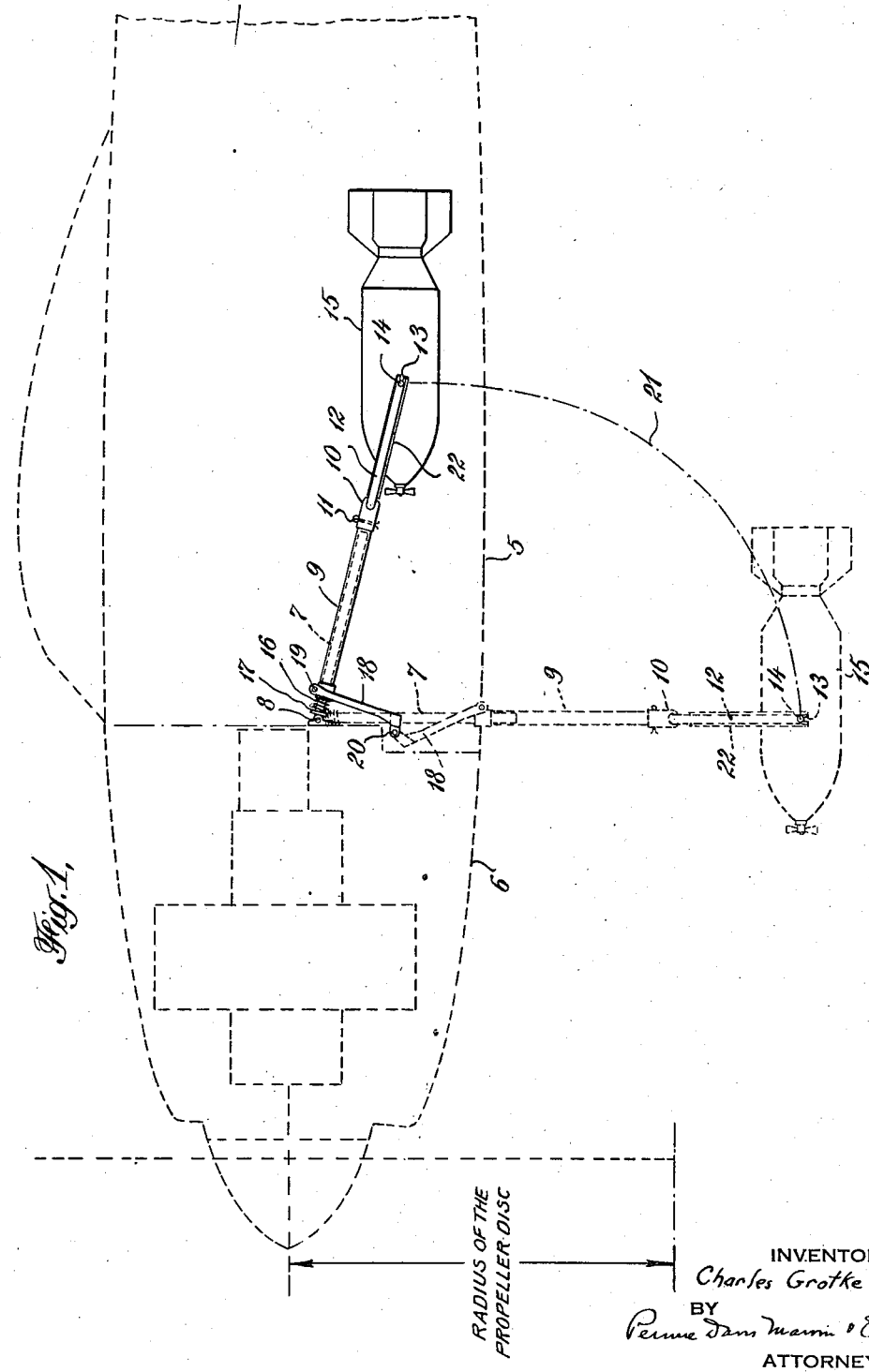

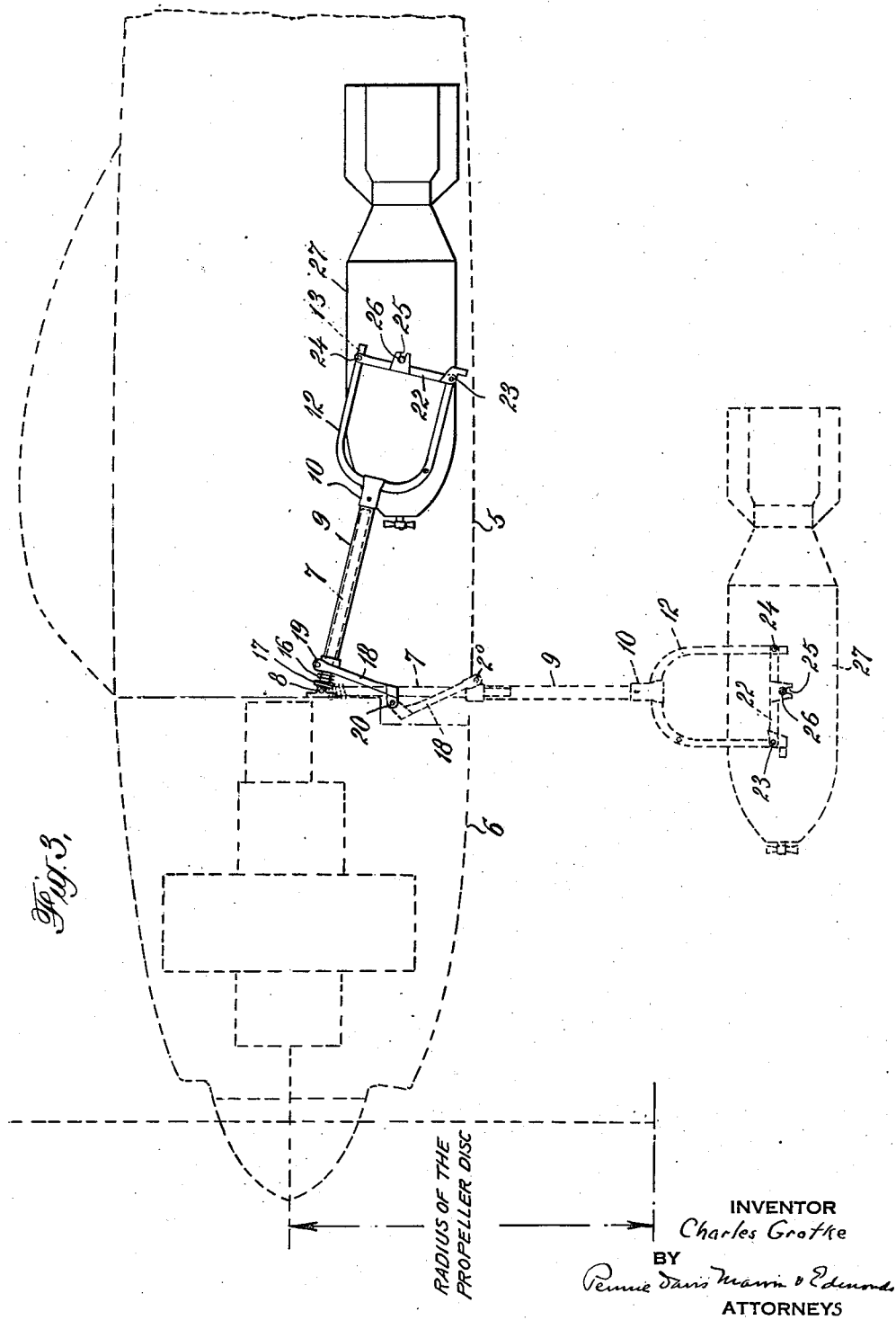

Patented Oct. 9, 1945

2,386,680

UNITED STATES PATENT OFFICE 2,386,680

DISPLACING GEAR FOR BOMBS

Charles Grotke, Bristol, Pa., assignor, by mesne assignments, to Reconstruction Finance Corporation Application July 29, 1942, Serial No. 452,675

12 Claims. (Cl. 89—1.5)

This invention relates to displacing gear for bombs employed as an accessory to the bomb racks of bombing aircraft.

When bombs are released from the bomb racks of dive bombers, the latter are usually traveling at an angle of approximately 70° to horizontal position, and it is necessary to direct the bomb as it is released so that it will not strike the propeller of the aircraft. A displacing gear for this purpose has been devised, including an arm of relatively long radius pivoted within the engine cowling and a fork to engage the bomb. This structure is subject to certain disadvantages arising particularly from the length of the arm required to ensure clearance of the bomb from the path of the propeller.

It is the object of the present invention to provide a more compact displacing gear for bombs which will nevertheless accomplish the desired purpose successfully and consistentlly, thereby avoiding the difficulties heretofore encountered.

Another object of the invention is the provision of bomb displacing gear which is readily adjustable to operate with bombs of different sizes so that substitution of equipment in aircraft is unnecessary when bombs of different sizes are employed.

Other objects and advantages of the invention will be apparent as it is better understood by reference to the following specification and the accompanying drawings, in which Fig. 1 is a side elevation of the device indicating its position in reference to the fuselage of an aircraft;

Fig. 2 is a front elevation showing a pair of the devices in extended position;

Fig. 3 is a side elevation of one of the devices adjusted to engage a bomb of larger dimensions;

Fig. 4 is a front elevation of a pair of the devices adjusted as in Fig. 3; and

Fig. 5 is a fragmentary elevation illustrating another adjustment to engage a bomb of a different size.

Referring to the drawings, 5 indicates the fuselage of an aircraft including the engine cowling 6. In carrying out the invention, I provide an arm 7 pivoted at 8 on a suitable fixed support on the aircraft behind the engine cowling 6. The arm 7 carries a tubular member 9 slidably supported thereon. A head 10 is mounted on the end of the tubular member 9 and is normally held in fixed position by a pin 11 which is removable. Upon removal of the pin, the head 10 can be rotated through an angle of 90° or an angle of 180° as may be desired for the purpose hereinafter explained. A fork 12 is secured to the head 10 and is provided at its ends with notches 13 adapted to engage pins 14 on the bomb 15 which is releasably supported in the bomb rack. A spring 16 disposed between the flange 17 and the end of the member 9 is a source of power to ensure prompt release of the mechanism and a cushion when it is returned. The details of the bomb rack and of the releasing mechanism form no part of the present invention and are not illustrated. When the bomb 15 is released, it will immediately drop, moving forward at the same time under the influence of its momentum.

Arms 18 are pivotally secured at 19 to the inner end of the member 9 and are also pivoted at 20 on a fixed part of the fuselage 5. When the bomb is released, the member 9 will be carried forwardly and downwardly and at the same time by the action of the arms 18 the member 9 will be caused to move along the arm 7, to the position indicated in dotted lines. As the member 9 is extended, it ensures movement of the bomb 15 along the path 21. As the member 9 reaches its lowermost position, the bomb has been forced far enough away from the fuselage to be outside the radius of movement of the propeller, and the bomb cannot, therefore, engage the propeller as it drops from the fork and continues its descent. Thus bombs may be dropped without danger to the operator of the aircraft.

The fork 12 is adapted to the diameter of a 500-pound bomb. Frequently it is necessary to carry and discharge bombs of 1000 or 2000 pounds, and the device is adjustable to permit its use with such bombs without modification. For this purpose a web 22 is pivotally mounted at 23 on each of the forks 12 and is normally secured by a removable pin 24 in the position indicated in Fig. 2 of the drawings. By removing the pins 24, the webs may be turned and secured in the position indicated in Fig. 3. At the same time, the pins 11 can be withdrawn to permit rotation of the heads 10 through an angle of 90° so that the forks are in the position indicated in Fig. 3. The webs 22 are provided with notches 25 adapted to engage pins 26 on a bomb 27 of 2000 pounds. Thus a pair of the devices may be adjusted and utilized to direct bombs of larger size precisely as hereinbefore described, that is to say, when the bomb is released it will be guided in its downward flight until it is sufficiently clear to avoid possible contact with the propeller. As indicated in Fig. 4, the forks 12 may be slightly offset from the axes of the members 9 to engage the pins 26 of the 2,000-pound bomb 27. When a 1,000-pound bomb is to be carried, the pins 11 are withdrawn and the heads 10 are rotated through an angle of 90° so that the slots 25 will engage the pins 28 on a 1,000-pound bomb 29. As in the preceding description, the bomb will be forced to follow a course which will ensure movement beyond the range of the propeller.

As will be readily understood from the foregoing description, the device is compact and it avoids the necessity of employing an arm of long radius pivoted within the engine cowling. In the operation, the member 9 is advanced positively by the movement of the arms 18 about their pivots and consequently there can be no possibility of failure of the device to extend to its limit and thus assure the desired trajectory of the bomb when it is released. Moreover, as indicated, the device is readily adjustabe to engage and direct bombs of different sizes. For use with the larger bombs, the devices are used in pairs, and as many pairs will be employed as the capacity of the aircraft permits.

The invention assures the safety of the operating personnel in so far as possibility of contact of the bombs with the propeller is concerned. The operator can execute a dive bombing maneuver with assurance that regardless of the angle of the aircraft the flight of the bombs dropped cannot pass through the radius of the propeller disc.

Various changes may be made in the form and structure of the apparatus without departing from the invention or sacrificing the advantages thereof.

I claim:

1. An aircraft including a bomb displacing gear, said gear comprising a member pivoted to the aircraft, an extension slidably mounted on the member, means on the extension to engage a bomb and means to positively advance the extension when the arm moves about its pivot, including an arm connected to the extension and pivoted on a center spaced from the pivot of the member.

2. An aircraft including a bomb displacing gear, said gear comprising an extensible member pivoted to the aircraft, a fork at the free end of said member having recesses to engage a bomb, means permitting adjustment of the fork rotatively about the axis of the extensible member, a web having a bomb-engaging recess adapted to be secured across the arms of the fork, and means to positively extend the extensible member when the latter moves about its pivot.

3. An aircraft including a bomb displacing gear, said gear comprising a member pivoted to the aircraft, an extension slidably mounted on said member, a fork at the free end of the extension having recesses to engage a bomb, and means to positively advance the extension when the arm moves about its pivot, including an arm connected to the extension and pivoted on a center spaced from the pivot of the member.

4. An aircraft including a bomb displacing gear, said gear comprising an extensible member pivoted to the aircraft, means on the extensible portion of said member to engage a bomb, and an arm so pivoted on the aircraft and connected to the extensible member that it is moved by downward movement of the extensible member and affects an extension thereof.

5. An aircraft including a bomb displacing gear, said gear comprising an extensible member pivoted to the aircraft, means on the extensible portion of said member to engage a bomb, and means to positively extend the extensible member when the latter moves about its pivot, including an arm pivoted to the aircraft on a center spaced from the pivot of the extensible member and so connected to the extensible member that it is moved by downward movement of the extensible member and affects an extension thereof.

6. An aircraft including a bomb displacing gear, said gear comprising a member pivoted to the aircraft, an extension slidably mounted on the member, means on the extension to engage a bomb, and an arm so pivoted on the aircraft and connected to the extension that it is moved by downward movement of the extension and affects a sliding movement thereof on said member.

7. An aircraft including a bomb displacing gear, said gear comprising an extensible member pivoted to the aircraft, a fork on the free end of said member having means to engage a bomb, and an arm so pivoted on the aircraft and connected to the extensible member that it is moved by downward movement of the extensible member and affects an extension thereof.

8. An aircraft including a bomb displacing gear, said gear comprising an extensible member pivoted to the aircraft, a fork at the free end of said member having means to engage a bomb and means to positively extend the extensible member when the latter moves about its pivot, including an arm pivoted on a center spaced from the pivot of the extensible member, and so connected to the extensible member that it is moved by downward movement of the extensible member and affects an extension thereof.

9. An aircraft including a bomb displacing gear, said gear comprising an extensible member pivoted to the aircraft, a fork at the free end of said member having means to engage a bomb, means permitting adjustment of the fork rotatively about the axis of the extensible member, and an arm so pivoted on the aircraft and connected to the extensible member that it is moved by downward movement of the extensible member and affects an extension thereof.

10. An aircraft including a bomb displacing gear, said gear comprising a member pivoted to the aircraft, an extension slidably mounted on said member, a fork at the free end of the extension having means to engage a bomb, and an arm so pivoted on the aircraft and connected to the extension that it is moved by downward movement on the extension and affects a sliding movement thereof on said member.

11. An aircraft including a bomb displacing gear, said gear comprising a pair of extensible members pivoted to the aircraft, means to positively extend each extensible member when the latter moves about its pivot, including an arm connected to the extensible member and pivoted on a center spaced from the pivot of the extensible member, and mechanism carried at the end of each extensible member including means to engage opposite sides of a bomb to carry the same and means to engage one side of a bomb and to cooperate with the corresponding means of the other member to carry a bomb, said mechanism being adjustable to be used in both of said manners.

12. An aircraft including a bomb displacing gear, said gear comprising a pair of extensible members pivoted to the aircraft, means to positively extend the extensible members when the latter move about their pivots including an arm for each extensible member so pivoted on the aircraft and connected to its extensible member that it is moved by downward movement of such extensible member and affects an extension thereof, and mechanism carried at the end of each extensible member including means to engage opposite sides of a bomb to carry the same and means to engage one side of a bomb and to cooperate with corresponding means of the other member to carry a bomb, said mechanism being adjustable to be used in both of said manners.

CHARLES GROTKE.